(12) United States Patent
Johansson et al.

(10) Patent No.: US 10,705,174 B2
(45) Date of Patent: Jul. 7, 2020

(54) RADIO ACCESS NETWORK NODE, POSITIONING NODE, AND METHODS THEREIN FOR HANDLING POSITIONING OF A MOBILE STATION

(71) Applicant: Telefonaktiebolaget LM Ericsson (publ), Stockholm (SE)

(72) Inventors: Nicklas Johansson, Brokind (SE); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/342,324

(22) PCT Filed: Oct. 18, 2017

(86) PCT No.: PCT/SE2017/051025
§ 371 (c)(1),
(2) Date: Apr. 16, 2019

(87) PCT Pub. No.: WO2018/084765
PCT Pub. Date: May 11, 2018

(65) Prior Publication Data
US 2019/0257911 A1    Aug. 22, 2019

Related U.S. Application Data

(60) Provisional application No. 62/416,199, filed on Nov. 2, 2016.

(51) Int. Cl.
*H04W 24/00* (2009.01)
*G01S 1/20* (2006.01)
(Continued)

(52) U.S. Cl.
CPC .................. *G01S 1/20* (2013.01); *G01S 5/14* (2013.01); *H04W 64/00* (2013.01); *H04W 64/003* (2013.01)

(58) Field of Classification Search
CPC ............................. H04W 64/00; H04W 4/02
(Continued)

(56) References Cited

U.S. PATENT DOCUMENTS

2003/0119524 A1     6/2003 Carlsson
2004/0106414 A1*    6/2004 Ewert .................. G07B 15/063
                                                             455/456.1
(Continued)

FOREIGN PATENT DOCUMENTS

RU      2462836 C2       9/2012
WO      WO2015189161 A1  12/2015

OTHER PUBLICATIONS

International Search Report and Written Opinion of the International Searching Authority for PCT International Application No. PCT/SE2017/051025 dated Jan. 22, 2018, 12 pages.
(Continued)

*Primary Examiner* — Temica M Beamer
(74) *Attorney, Agent, or Firm* — Sage Patent Group

(57) ABSTRACT

A method performed by a radio access network node is provided. The radio access network node serves a Mobile Station (MS).
The radio access network node receives a message from a positioning node, to be forwarded to the MS. The message comprises an indication that said message comprises a command to the MS to perform a Multilateration Timing Advance procedure for determining a position of the MS.

10 Claims, 7 Drawing Sheets

Method in Radio Access Network Node 110

(51) Int. Cl.
*G01S 5/14* (2006.01)
*H04W 64/00* (2009.01)

(58) Field of Classification Search
USPC .......................................... 455/456.1, 456.2
See application file for complete search history.

(56) References Cited

U.S. PATENT DOCUMENTS

| | | |
|---|---|---|
| 2006/0025158 A1 | 2/2006 | Alcatel |
| 2009/0279495 A1* | 11/2009 | Yoo ...................... H04L 5/0078 370/329 |

OTHER PUBLICATIONS

Notification of Transmittal of the International Preliminary Report on Patentability for PCT International Application No. PCT/SE2017/051025 dated Sep. 25, 2018, 16 pages.
ETSI MCC, "Draft Report of 3GPP TSG RAN WG6 Meeting #1, Gothenburg, Sweden, Aug. 22-26, 2016," 29 pages.
LM Ericsson, "Mulilateration Signaling for GERAN," 3GPP R6-160081, RAN WG6 Meeting #1, Gothenburg, Sweden, Aug. 22-26, 2016, 6 pages.
Nokia, "Radio Interface Enhancements for TA based multilateration (Updated of RP-160034)," 3GPP TSG-RAN WG6 #1, Gothenburg, Sweden, Aug. 22-26, 2016, R6160085, 10 pages.
Nokia, "Energy Consumption Analysis of Radio Interface Procedures for Positioning Enhancements," 3GPP TSG RAN6 #1, Gothenburg, Sweden, Aug. 22-26, 2016, R6160086, 11 pages.
Ericsson LM et al., "New Work Item Positioning Enhancements for GERAN," 3GPP TSG RAN Meeting #72, Busan, Korea, Jun. 13-16, 2016, RP-161260, 8 pages.
Ericsson, "Positioning Enhancements for GERAN—introducing Timing Advance trilateration," 3GPP TSG RAN #72, Busan, Korea, Jun. 13-16, 2016, RP-161034, 7 pages.
3GPP TS 44.060 V13.2.0, "3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 13)," Jun. 2016, 744 pages.
Russian Federal Institute of Industrial Property, Russian Office Action, Application No. 2019116831/07 (032188), dated Nov. 20, 2019, 11 pages.
3GPP TS 44.031 V13.0.0, "3rd Generation Partnership Project; Technical Specification Group GSM/EDGE Radio Access Network; Location Services (LCS); Mobile Station (MS)—Serving Mobile Location Centre (SMLC); Radio Resource LCS Protocol (RRLP); (Release 13)," Jan. 2016, 157 pages.
3GPP TS 49.031 V13.0.0, "3rd Generation Partnership Project; Technical Specification Group GSM/EDGE Radio Access Network; Location Services (LCS); Base Station System Application Part LCS Extension (BSSAP-LE); (Release 13)," Jan. 2016, 52 pages.

* cited by examiner

Fig. 4. Method in Radio Access Network Node 110

Fig. 5. Method in Positioning Node 130

RADIO ACCESS NETWORK NODE, POSITIONING NODE, AND METHODS THEREIN FOR HANDLING POSITIONING OF A MOBILE STATION

CROSS REFERENCE TO RELATED APPLICATIONS

This application is a 35 U.S.C. § 371 national stage application of PCT International Application No. PCT/SE2017/051025 filed on Oct. 18, 2017, which claims the benefit of U.S. Provisional Patent Application Ser. No. 62/416,199, filed on Nov. 2, 2016, the disclosures and content of which are incorporated by reference herein in their entireties.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain.

Positioning

At RAN #72 a Work item on "Positioning Enhancements for GSM EDGE Radio Access Network (GERAN)" for realizing improved accuracy was approved. EDGE is the abbreviation for Enhanced Data Rates for GSM Evolution. In this work idem a candidate method for realizing improved accuracy is specified wherein a Mobile Station (MS) performs Timing Advance (TA) multilateration, see Positioning Enhancements for GERAN, which relies on establishing the position of the MS based on TA values in multiple cells. This procedure of TA multilateration is also referred to as Multilateration Timing Advance procedure.

At RAN1#86 a proposal based on a similar approach was made also to support positioning of Narrow Band-Internet of Things (NB-IoT) mobiles.

TA is a measure of the propagation delay between a base transceiver station (BTS) and the MS, and since the speed by which radio waves travel is known, the distance between the BTS and the MS can be derived. Further, if TA is measured to multiple BTSs and the positions of these BTSs are known, the position of the MS can be derived. Measurement of TA requires that the MS synchronizes to each neighbor BTS and transmits a signal time-aligned with the timing of the BTS, estimated by the MS. The BTS measures the time difference between its own time reference, and the timing of the received signal. This time difference is equal to two times the propagation delay between the BTS and the MS (one propagation delay of the BTS's synchronization signal to the MS, plus one equally large propagation delay of the signal transmitted by the MS back to the BTS).

Once the set of TA values are established, the position of the device can be derived through so called Multilateration where the positions of the device such as an MS is determined by the intersection of a set of hyperbolic curves associated with each BTS, see FIG. 1. FIG. 1, Illustrates a Multilateration involving three base stations associated with three timing advance values for a device.

The calculation of the position of the device is typically carried out by a positioning node such as e.g. a Serving Mobile Location Centre (SMLC) which implies that all of the derived timing advance and associated BTS information needs to be sent to positioning node that initiated the procedure.

For the purpose of simplifying the descriptions provided herein the following definitions are used:

Foreign BTS: A BTS associated with a BSS that uses a positioning node that is different from the positioning node used by the BSS that manages the cell serving the MS when the positioning procedure is initiated. In this case the derived TA information and identity of the corresponding cell are relayed to the serving positioning node using the core network (i.e. in this case the BSS has no context for the MS).

Local BTS: A BTS associated with a different BSS but still a BSS that uses the same positioning node as the BSS that manages the cell serving the MS when the positioning procedure is initiated. In this case the derived timing advance information and identity of the corresponding cell are relayed to the serving positioning node using the core network (i.e. in this case the BSS has no context for the MS).

Serving BTS: A BTS associated with a BSS that manages the cell serving the MS when the positioning procedure is initiated. In this case the derived timing advance information and identity of the corresponding cell are sent directly to the serving positioning node (i.e. in this case the BSS has a context for the MS).

Serving SMLC node: The SMLC node that commands a MS to perform the Multilateration procedure, i.e. it sends the Radio Resource Location services (LCS) Protocol (RRLP) Multilateration Request to the MS).

Serving BSS: The BSS associated with the serving BTS (i.e. the BSS that has context information for the TLLI corresponding to a MS for which the Multilateration procedure has been triggered).

Non-serving BSS: A BSS associated with a Foreign BTS (i.e. a BSS that does not have context information for the TLLI corresponding to a MS for which the Multilateration procedure has been triggered).

A Connection-oriented message requires a session connection to be established before any data can be sent. This method is often referred to as a reliable network service, since it may guarantee that data will arrive in the same order.

A Connectionless message on the contrary, does not require a session connection between sender and receiver. The sender simply starts sending packets to the destination. This service does not have the reliability of the connection-oriented method, but it is useful for periodic burst transfers. A connectionless network provides minimal services.

Internet of Things

It is expected that in a near future, the population of Cellular Internet of Things (IoT) devices such as MSs will be very large. Various predictions exist, among which can be mentioned that assumes >60000 devices per square kilometer, and that assumes 1000000 devices per square kilometer. A large fraction of these devices are expected to be stationary, e.g., gas and electricity meters, vending machines, etc.

Extended Coverage (EC)-GSM-IoT and Narrow band (NB)-IoT are two standards for Cellular IoT specified by 3GPP TSG GERAN and TSG RAN.

SUMMARY

The positioning specifications call for the serving positioning node, such as e.g. the serving SMLC, to send an RRLP message to the MS in order to initiate a specific type of positioning procedure in the MS. This RRLP message, see 3GPP TS 44.031 is sent from the serving SMLC to the serving BSS within a BSSMAP-LE Connection Oriented Information message defined in TS 49.031. This is e.g. since an SCCP connection exists between the serving BSS and the serving SMLC due to the SMLC previously receiving a BSSMAP-LE Perform Location Request from the serving BSS. The serving BSS then relays the RRLP message to a Serving GPRS Support Node (SGSN) for delivery to the MS as payload within a downlink LLC PDU. GPRS is the abbreviation for General Packet Radio Service. The problem with the existing solution for transfer of RRLP messages is that the serving BSS will not know that the RRLP message contains a Multilateration Request nor will it know for how long it must maintain the SCCP connection associated with the given device, e.g. the serving BSS will only know that some type of positioning procedure has been initiated by the serving SMLC. The SCCP connection may then be released before the positioning procedure is completed. This may result in an MS for which the positioning procedure is triggered not being properly positioned due to the premature release of the SCCP connection, and the interrupted positioning procedure must start again from the beginning with the possibility of a failed positioning procedure being experienced repeatedly.

It is therefore an object of embodiments herein to provide an improved way of positioning of an MS to enhance the performance of a wireless communications network.

According to a first aspect the object is achieved by a method performed by a radio access network node such as e.g. a BSS. The radio access network node 110 serves a Mobile Station, MS.

The radio network node receives a message such as e.g. a RRLP message from a positioning node, such as e.g. an SMLC, to be forwarded to the MS. The message comprises an indication that said message comprises a command to the MS to perform a Multilateration Timing Advance procedure for determining a position of the MS.

According to a second aspect the object is achieved by a method performed by a positioning node, such as e.g. an SMLC.

The positioning node sends a message such as e.g. a RRLP message to a radio access network node such as e.g. a BSS, to be forwarded to a Mobile Station, MS. The radio access network node 110 serves a Mobile Station, MS.

The message comprises an indication that said message comprises a command to the MS to perform a Multilateration Timing Advance procedure for determining a position of the MS.

According to a third aspect the object is achieved by a radio access network node such as e.g. a BSS. The radio access network node is configured to serve a Mobile Station, MS. The radio access network node such as e.g. the BSS, may be configured to:

Receive a message such as e.g. a RRLP message from a positioning node, such as e.g. an SMLC, to be forwarded to the MS.

The message comprises an indication that said message comprises a command to the MS to perform a Multilateration Timing Advance procedure for determining a position of the MS.

According to a fourth aspect the object is achieved by a positioning node, such as e.g. an SMLC, which is configured to:

Send, a message such as e.g. a RRLP message to a radio access network node 110 such as e.g. a BSS, to be forwarded to a Mobile Station, MS. The radio access network node serves a Mobile Station, MS.

The message comprises an indication that said message comprises a command to the MS to perform a Multilateration Timing Advance procedure for determining a position of the MS.

All of the signalling between the radio access network node and the positioning node may be a so called connection oriented. This means that each signalling connection is associated with a specific MS for which the positioning procedure has been triggered by the positioning node. The signalling connection is established at the beginning of the positioning procedure and preferably needs to be kept until the positioning procedure is ended.

For example, in order for the radio access network node to know for how long to keep the connection it needs to know that it has started a positioning procedure for which there may not be any final RRLP message from the MS that the radio access network node 110 may use as indication that the positioning procedure has ended.

An advantage with embodiments herein is that the radio access network node will know when the Multilateration Timing Advance procedure is started for a given MS as well as for how long the radio access network node needs to maintain the corresponding connection. By knowing this, the connection is not released until the positioning procedure is completed which avoids interruption of the positioning procedure and the requirement to start the positioning procedure again from the beginning. This results in an improved way of positioning of the MS, for positioning procedures that do not require a MS to send a RRLP message indicating completion of a positioning procedure from the MS perspective which in turn results in an enhanced performance of the wireless communications network.

BRIEF DESCRIPTION OF THE DRAWINGS

Examples of embodiments herein are described in more detail with reference to attached drawings in which.

DETAILED DESCRIPTION

In order for a radio access network node to know when a message comprises a Multilateration Request, embodiments herein add means for a positioning node to indicate to the serving radio access network node that a message comprises an RRLP Multilateration Request message.

According to an example embodiments, in order for a BSS to know when an RRLP message comprises a Multilateration Request, embodiments herein add means for an SMLC node to indicate to the serving BSS that a BSSMAP-LE Connection Oriented Information message comprises an RRLP Multilateration Request message.

Figure 3:
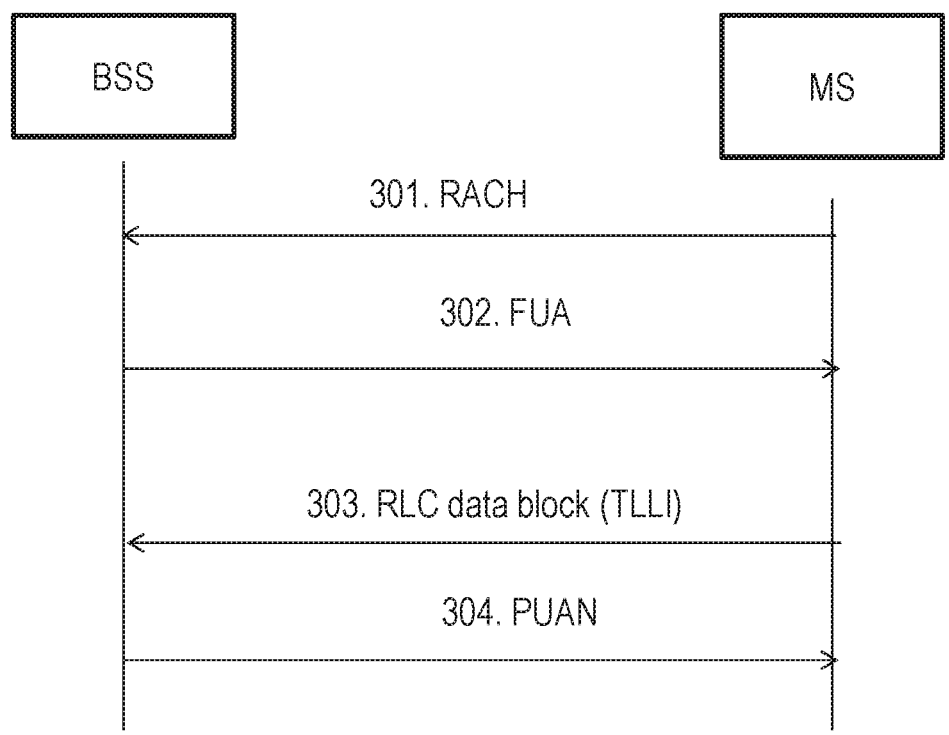
FIG. 3 is a signalling diagram illustrating embodiments of a method.

In some embodiments where the indicated Multilateration procedure is "Multilateration Timing Advance Only" (MTAO), a set of BTS managed by one or more BSS, such as the radio access network nodes, are involved in the Multilateration procedure may only acquire cell specific timing advance information to be relayed to the serving SMLC. MTAO when used herein may e.g. mean a multilateration method wherein the MS autonomously selects a set of cells for performing the positioning procedure, sends an access request on the RACH of each of the selected cells, is assigned a packet channel resource in response to sending the access request and sends an RLC data block thereon as shown in FIG. 3 described below. The BTS managing a cell used by the MS for performing MTAO derives timing advance information from the access request and RLC data block it receives from the MS in that cell and relays the derived timing advance information to the serving SMLC. A variation of MTAO is where the MS is provided with "Short Identity" information within a RRLP Multilateration Request message in which case the access request sent on the RACH includes "Short Identity" information and the MS is not assigned a packet channel resource in each cell it uses to perform the positioning procedure, i.e. for this variation the BTS managing a cell used by the MS for performing MTAO using "Short Identity" information derives timing advance information from the access request only and relays it to the serving SMLC.

Some embodiments herein further comprise means for the MS to convey a timer to the radio access network node such as the serving BSS that determines how long the MTAO procedure is to run in the serving BSS. Upon expiration of the timer such as e.g. a MTAO specific timer, the corresponding SCCP connection between the serving BSS and the serving SMLC is released and the serving SMLC may then proceed with calculating the MS position. This is e.g. since no additional cell specific timing advance information will be forthcoming from the serving BSS for that specific positioning procedure.

Means may also be added to allow the positioning node such as the serving SMLC node to provide the radio access network node such as the serving BSS with a Short Identity field, e.g. 8 bits long, associated with the SCCP connection. This allows for the case where a MS performs MTAO using "Short Identity" information in which case the radio access node managing a cell used by the MS for performing MTAO using a "Short Identity" value is able to map the "Short Identity" information it receives from the MS to the specific SCCP connection associated with the same "Short Identity" value and then relay the derived timing advance information for that MS to the serving SMLC using that SCCP connection. The serving SMLC knows implicitly which MS has been assigned the use of the SCCP connection since the serving SMLC is the node that establishes the SCCP connection e.g. upon deciding to trigger the Multilateration Timing Advance procedure for a given MS.

As mentioned above, EC-GSM-IoT and NB-IoT are two standards for Cellular IoT specified by 3GPP TSG GERAN and TSG RAN.

In a general context, the embodiments disclosed in this Disclosure are also applicable to other standards such as NB-IoT, LTE and UMTS implementing Multilateration.

Figure 1:
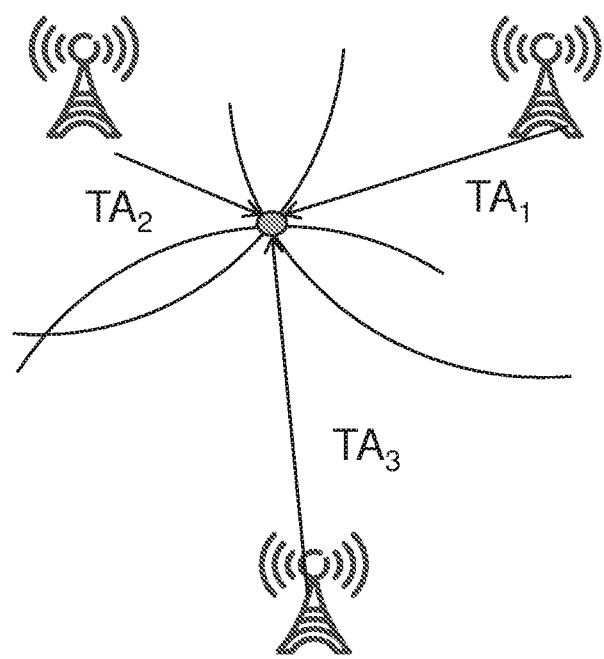
FIG. 1 is a schematic block diagram illustrating an overview of Multilateration according to prior art.
Figure 2:
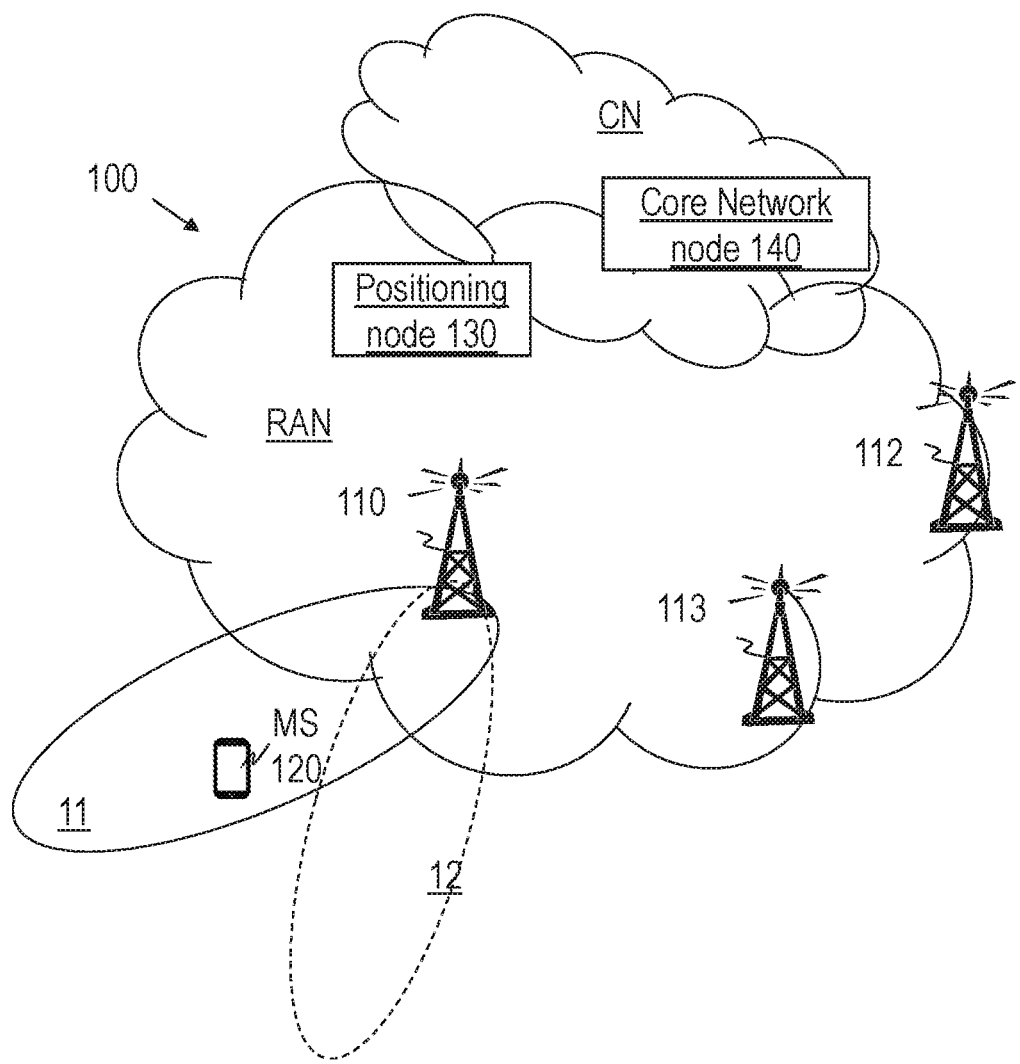
FIG. 2 is a schematic block diagram depicting embodiments of a communication network.

Embodiments herein relate to a communication networks in general. FIG. 2 is a schematic overview depicting a communication network 100. The communication network 100 may be a wireless communications network comprising one or more RANs and one or more CNs. The communication network 100 may use a number of different technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 100, mobile stations e.g. an MS 120 such as wireless device, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Network nodes operate in the wireless communication network 100 such as a radio access network node 110. The radio access network node 110 provides radio coverage over a geographical area, a service area 11, which may also be referred to as a beam or a beam group where the group of beams is covering the service area of a first radio access technology (RAT), such as 5G, LTE, Wi-Fi or similar. Further network nodes operate in the wireless communication network 100 such as a second radio access network node 112 and a third radio access network node 113.

The radio access network node 110 may be a transmission and reception point e.g. a radio access network node such as a Wireless Local Area Network (WLAN) access point or an Access Point Station (AP STA), an access controller, a base station, e.g. a radio base station such as BSS, a NodeB, an evolved Node B (eNB, eNode B), a BTS, a radio remote unit, an Access Point Base Station, a base station router, a transmission arrangement of a radio base station, a stand-alone access point or any other network unit capable of communicating with a wireless device within the service area served by the respective network nodes 110 and 112 and 113 depending e.g. on the first radio access technology and terminology used.

A positioning node 130, such as e.g. an SMLC node operates in the communication network 100. The positioning node 130 commands the MS 120 to perform the Multilateration procedure.

A core network node 140, such as e.g. an SGSN operates in the CN of the communication network 100.

As part of developing embodiments herein a problem will first be identified and discussed.

At the RAN6#1 meeting several options regarding the signaling and detailed procedure for the Multilateration procedure was discussed. On a high level two options were on the table referred to as Network assisted method and MS autonomous method. In the network assisted method the network decides the base stations to be used for Multilateration (based on measurement report from the MS) while in the MS autonomous method the MS decides the cells to be used based on signal strength [R6-160012].

One procedure to determine the timing Advance value is illustrated FIG. 3 for a serving BSS and EC-GSM-IoT supporting device. FIG. 3, Illustrates timing advance determination and collection procedure for the radio access network node 110 such as the Serving BSS It should be noted that the actual timing advance value estimation is carried out by the BTS and may be done on only the access burst in the first Extended Coverage Random Access Channel (EC-RACH) message 301 or further refined using also the four normal burst used to send the RLC data block carrying the Temporary Logical Link Identifier (TLLI) 303 assigned by the Fixed Uplink Allocation (FUA) 302. The BTS may also use the additional blind repetitions when estimating the timing advance value for an EC-GSM-IoT device in extended coverage, i.e. Coverage Class 2 or higher. The Packet Uplink Ack/Nack (PUAN) message 304 of FIG. 3 is sent by the BSS to confirm reception of the RLC data block, thereby allowing the MS to consider MTAO to be completed in the current cell and it therefore proceeds to the next cell to be used for performing the positioning procedure.

When all BTS such as the radio access network nodes 110, 112, 113, used in the Multilateration positioning procedure are served by the same BSS it may be sufficient to only determine the Timing Advance value using an access request, e.g. on the Random Access Channel (RACH) or EC-RACH, for determining the position of the target MS 120. E.g. the transmission of an Radio Link Control (RLC) data block in addition to the access request may not be needed. In this case the MS 120 includes an identity field such as a "Short Identity" field, e.g. 8 bits long, in each access request it sends during the corresponding Multilateration procedure. See 3GPP R6-160085.

Example embodiments of a method performed by a radio access network node 110 such as e.g. a BSS will now be described with reference to a flowchart depicted in FIG. 4. The method will first be described in a view seen from the radio network node 110 together with FIG. 5, and in a view seen from the positioning node 130 together with FIG. 6, followed by a more detailed explanations and examples. The radio access network node 110 serves the MS 120, The method comprises the following actions, which actions may be taken in any suitable order.

Action 401

The radio access network node 110 receives a message from a positioning node 130, to be forwarded to the MS 120. In some embodiments the message is e.g. represented by an RRLP message from the positioning node 130, such as e.g. an SMLC. E.g. to notify the radio access network node 110 that the message comprises an Multilateration request, i.e. that the MS 120 is requested to perform a positioning procedure, the message comprises an indication that said message comprises a command to the MS 120 to perform a Multilateration Timing Advance procedure for determining a position of the MS 120. This is an advantage since without the indication, the radio access network node 110 would only know that some kind of positioning procedure has started but not what kind of positioning procedure. But the indication indicates that the type of positioning procedure is a Multilateration Timing Advance procedure.

In some embodiments, the message is received in a Connection Oriented message such as e.g. the BSS-MAP CONNECTION ORIENTED INFORMATION Message sent using a connection, such as e.g. an SCCP connection between the radio access network node 110 and the positioning node 130. The radio access network node 110 may be the serving BSS and the positioning node 130 may be the serving SMLC.

The indication may e.g. be comprised in the BSS-MAP CONNECTION ORIENTED INFORMATION Message as new IE as new fields in already existing IEs or as new BSSLAP message. BSSLAP defines the SMLC BSS layer 3 protocol.

The Connection Oriented message may further comprise a timer. The timer determines how long time a Multilateration Timing Advance procedure is to run in the radio access network node 110.

In some embodiments, an identity assigned by the positioning node 130 and associated with the SCCP connection, is further received by the radio access network node 110. Thereby the radio access network node 110 is allowed to uniquely associate the SCCP connection with the commanded Multilateration Timing Advance procedure using the value of the "Short Identity". This is an advantage since this allows the radio access network node 110 to know where to relay timing advance information whenever a MS performs the Multilateration Timing Advance procedure such as e.g. MTAO, using the same "Short Identity" value received by the radio access network node 110 from the positioning node 130. In other words, for the case where the MS 120 performs the Multilateration Timing Advance procedure using "Short Identity" information in a given cell, the radio access network node 110 managing that cell is able to map the "Short Identity" information it receives from the MS 120, e.g. in the access request received on RACH or EC-RACH, to a specific SCCP connection associated with the same "Short Identity" value and then relay the derived timing advance information for that MS to the serving SMLC node using that SCCP connection.

In some embodiments, the identity is a Short Identity which for example may be 8 bits long. The identity may be assigned by the positioning node 130, such as e.g. the serving SMLC, and associated with the connection such as e.g. the SCCP connection.

Action 402

The radio access network node 110 may, based on the time when receiving the message with the indication that a Multilateration Timing Advance procedure is to be performed for a given MS 120 and knowing by default how long time the positioning procedure is to remain active, calculate the point in time for releasing the connection.

As an alternative example, by means of an explicit timer included in the received message, the radio access network node 110 may control that the connection is not released until the positioning procedure is completed which in this alternative is when the timer expires. Thus in some embodiments, upon expiration of the timer or at the calculated point in time for releasing the connection, the radio access network node 110 releases the connection such as e.g. the SCCP connection between the radio access network node 110 and the positioning node 130, thereby enabling the positioning node 130 to proceed with calculating the position of the MS. This release of the SCCP connection implicitly indicates to the positioning node 130 that no additional cell specific timing advance information will be forthcoming from the radio access network node 110 such as the serving BSS for that specific positioning procedure. The timer is received by the radio access network node 100 in the message from the positioning node 130. The radio access network node 100 may be considered to be the master node regarding when the SCCP connection is to be released since there may be situations where the radio access network node 100 chooses to release the SCCP connection even when the timer is still running, e.g. when it detects an uplink data transmission having nothing to do with Multilateration Timing Advance has been triggered by the corresponding MS 120.

Figure 5:
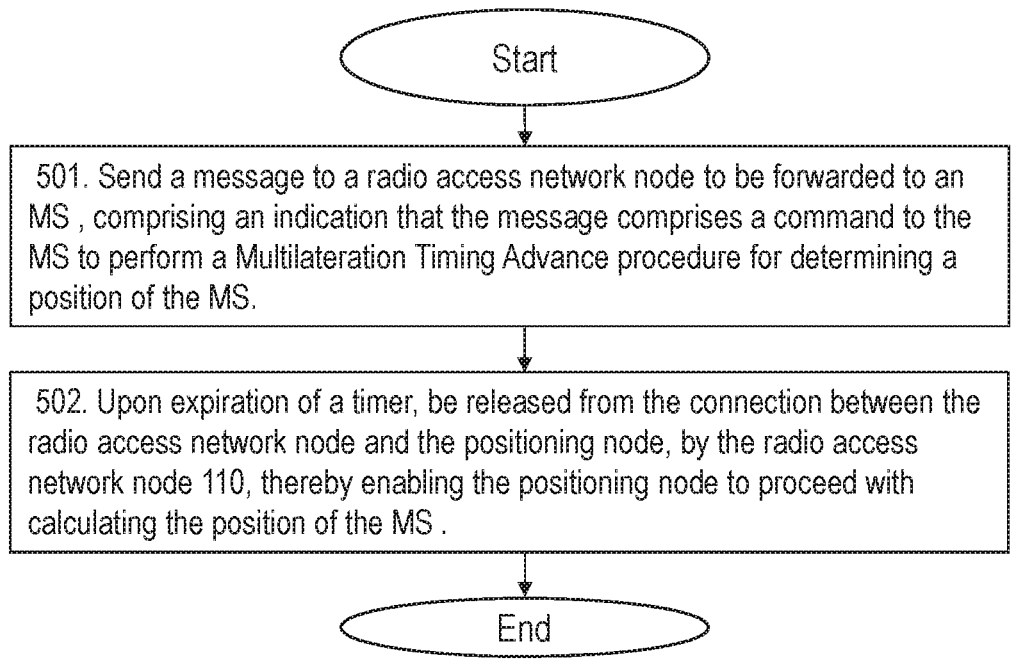
FIG. 5 is a flowchart depicting embodiments of a method from a positioning node perspective.

Example embodiments of a method performed by a positioning node 130 such as e.g. an SMLC will now be described with reference to a flowchart depicted in FIG. 5.

As mentioned above, the radio access network node 110 serves the MS 120.

The method comprises the following actions, which actions may be taken in any suitable order.

Action 501

The positioning node 130 sends a message such as e.g. a RRLP message to a radio access network node 110 such as e.g. a BSS, to be forwarded to the MS 120. In some embodiments the message is an RRLP message to the radio access network node 110 which e.g. may be a BSS.

The message comprises an indication that said message comprises a command to the MS 120 to perform a Multilateration Timing Advance procedure for determining a position of the MS 120. As mentioned above, this is an advantage since without the indication, the radio access network node 110 would only know that some kind of positioning procedure has started but not what kind of positioning procedure. But the indication indicates that the type of positioning procedure is a Multilateration Timing Advance procedure The message may be sent in a Connection Oriented message such as e.g. the BSS-MAP CONNECTION ORIENTED INFORMATION Message may be sent using an connection such as an SCCP connection between the radio access network node 110 such as the serving BSS and the positioning node 130, such as e.g. the serving SMLC.

The indication may e.g. be comprised in the BSS-MAP CONNECTION ORIENTED INFORMATION Message as new IE as new fields in already existing IEs or as new BSSLAP message.

The Connection Oriented message may further comprise a timer, which timer determines how long time a Multilateration Timing Advance procedure is to run in the radio access network node 110.

In some embodiments, an identity is sent to the radio access network node 110. The identity may be comprised in a Short Identity field e.g. being 8 bits long or similar. The identity is assigned by the positioning node 130, such as e.g. the serving SMLC, and is associated with the connection such as e.g. the SCCP connection. It thereby allows the radio access network node 110 to uniquely associate the connection such as the SCCP connection with the commanded Multilateration Timing Advance procedure. This is an advantage since this helps the radio access network node 110 to know where to relay timing advance information whenever a MS performs the Multilateration Timing Advance procedure, e.g. MTAO, using the same "Short Identity" value received by the radio access network node 110 from the positioning node 130. In other words, for the case where the MS 120 performs the Multilateration Timing Advance procedure using "Short Identity" information in a given cell, the radio access network node 110 managing that cell is able to map the "Short Identity" information it receives from the MS 120 e.g. in the access request received on RACH or EC-RACH, to a specific SCCP connection associated with the same "Short Identity" value and then relay the derived timing advance information for that MS to the serving SMLC node using that SCCP connection.

Action 502

Upon expiration of the timer, the positioning node 130 is being released from the connection between the radio access network node 110 and the positioning node 130, by the radio access network node 110. Thereby the positioning node 130 is enabled to proceed with calculating the position of the MS. This is e.g. since the release of the connection indicates that no additional cell specific timing advance information will be forthcoming from the serving radio access network node 110 for that specific positioning procedure.

In some embodiments, the connection e.g. is the SCCP connection between the radio access network node 110 such as the serving BSS and the positioning node 130 such as e.g. the serving SMLC. The connection is released by the radio access network node 110 such as the serving BSS.

Advantages with the provided embodiments are that the radio access network node 110 such as the BSS will know when the Multilateration procedure is started for a given device such as the MS 120 as well as for how long the radio access network node 110 such as the BSS needs to maintain the corresponding SCCP connection. This is especially useful when the multilateration procedure involves cells in neighbouring radio access network nodes such as BSS, e.g. the radio access network nodes 112 and 113, or Routing Areas wherein additional signalling delay in the core network needs to be taken into account. In addition, the inclusion of timer information in e.g. the BSSMAP-LE Connection Oriented Information message, e.g. as new IE, as new fields in already existing IEs or as new BSSLAP message, allows the serving positioning node 130 such as the serving SMLC to control the latency associated with calculating the position of any given MS such as the MS 120 for which position information has been requested by an application server in the network. E.g. in some cases the serving positioning node 130 such as the serving SMLC may be willing to allow for a smaller set of cell specific timing advance information when calculating the position of a given MS such as the MS 120. Further, the inclusion of an identity such as a "Short Identity" in the BSSMAP-LE Connection Oriented Information message, e.g. as a new IE, as new fields in already existing IEs or as a new BSSLAP message, allow the serving radio access network node 110 such as the serving BSS to associate the "Short Identity" with the SCCP connection used for sending the Connection Oriented Information message and thereby be able to know where to relay timing advance information whenever a MS performs the Multilateration Timing Advance procedure, e.g. MTAO, using the same "Short Identity" value received in the Connection Oriented Information message. In other words, for the case where a MS 120 performs the Multilateration Timing Advance procedure using "Short Identity" information in a given cell, the radio access network node 110 managing that cell is able to map the "Short Identity" value it receives from the MS 120, e.g. in the access request received on RACH or EC-RACH, to a specific SCCP connection associated with the same "Short Identity" value and then relay the derived timing advance information for that MS 120 to the serving SMLC node using that SCCP connection.

Example Embodiments

In the following, embodiments herein are illustrated by exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Embodiments below will be exemplified with GSM/EDGE as the communications network 100. The core network node 130 will be exemplified with an SGSN, but generally it may be another core network node serving the communication device as well. For example, for NB-IoT the applicable core network node may also be an MME. The radio access network node 10 is exemplified with a BSS and the MS 120 such as the communication device will be exemplified with a mobile station, sometimes also referred to as the device.

In some first example embodiments herein, to notify the serving radio access network node 110 such as the serving BSS that the message such as the RRLP messages to be sent from the serving positioning node 130 such as the serving SMLC to the MS 120 comprises a Multilateration Request, embodiments herein may add a new information element (IE) to the BSS-MAP CONNECTION ORIENTED INFORMATION Message, see Table 1 and add a new Information Element (IE) e.g. to be called Multilateration Positioning Method (MPM) in 3GPP TS 49.031. This is shown below in Table 1, where in addition to notifying the serving radio access network node 110 such as the serving BSS that the RRLP message is a Multilateration Request by means of the indication, also a timer as well as an identity such as a "Short Identity" has been included as new information elements. This is so that the positioning node 130 such as SMLC is enabled to control how long the SCCP connection will be maintained. The serving radio access network node 110 such as the serving BSS, upon receiving derived timing advance information from a BTS such as used during Multilateration, e.g. the radio access network nodes 110, 112 and 113, may also receive the "Short Identity" value sent by the MS 120 for which the timing advance information was derived. The serving radio access network node 110 such as the BSS then identifies the SCCP connection associated with the same "Short Identity" value as sent by the MS 120 and relays the derived timing advance information to the positioning node 130 using that SCCP connection. It should be noted to anyone skilled in the art that the proposed section in 3GPP TS 49.031 is just one realization of the first embodiment. It is e.g. possible to only have a one-bit field for the Multilateration Positioning Method field, to allow for different values for the timer or not to have a timer at all and not to include a "Short Identity" It may also e.g. be possible not to have any MPM field and let the presence of the MPM timer field indicate to the serving radio access network node 110 such as the serving BSS that the RRLP message sent from the serving positioning node 130 such as the serving SMLC to the MS 120 comprises a Multilateration Request message.

TABLE 1

BSSMAP-LE CONNECTION ORIENTED INFORMATION message content.

| Information element | Type/Reference | Presence | Format | Length in octets |
|---|---|---|---|---|
| Message type | Message Type | M | V | 1 |
| BSSLAP APDU | APDU | M | TLV | 3-n |
| Segmentation | Segmentation | C | TLV | 3 |
| Multilateration Positioning Method | Multilateration Positioning Method | C (Note 1) | TLV | 3 |

NOTE 1:
This IE is included when this message is sent from the SMLC to the BSS during the Multilateration procedure.

NOTE 2:
This IE is included when this message is sent from the BSS to the SMLC during the Multilateration procedure.

Embodiments herein relating to section in TS 49.031:

10.xx Multilateration Positioning Method (49.031)

This is a fixed length information element that carries information identifying the specific Multilateration positioning method that has been triggered by the SMLC.

| | 8 | 7 | 6 | 5 | 4 | 3 | 2 | 1 |
|---|---|---|---|---|---|---|---|---|
| Octet 1 | | | | IEI | | | | |
| Octet 2 | spare | | | MPM Timer | | | MPM | |
| Octet 3 | | | | Short Identity | | | | |

FIG. 10.xx.1: Multilateration Positioning Method Information above.

TABLE 10.xx.1

| Multilateration Positioning Method information elements below |
|---|
| MPM (Multilateration Positioning Method) (bits 1 and 2 of octet 2) |
| This field indicates the specific Multilateration positioning method triggered by the SMLC. |
| 2 1 |
| 0 0       MTAO triggered |
| 0 1       reserved |
| 1 0       reserved |
| 1 1       reserved |
| MPM Timer (bits 3, 4 and 5 of octet 2) |
| This field indicates a MTAO specific timer value that determines how long the MTAO procedure is to run in the BSS. Upon expiration of the MTAO specific timer the BSS releases corresponding SCCP connection between the BSS and the SMLC |
| 3 2 1 |
| 0 0 0       2 seconds |
| 0 0 1       4 seconds |
| 0 1 0       6 seconds |
| 0 1 1       8 seconds |
| 1 0 0       10 seconds |
| 1 0 1       15 seconds |
| 1 1 0       20 seconds |
| 1 1 1       25 seconds |
| Short Identity (Octet 3) |
| This field indicates an MS specific short identity used in the Random access procedure when sending and access request for the purpose of Multilateration. |

In some second example embodiments, new fields are added to the RRLP flag IE. The RRLP flag IE is present in the BSS Application Part (BSSAP) MS Position Command message (see 3GPP TS 48.071) carried within the BSSLAP APDU IE of the BSSMAP-LE CONNECTION ORIENTED INFORMATION message. This message is sent from the serving positioning node 130 such as the serving SMLC to the serving radio access network node 110 such as the serving BSS. This is shown in the MS Position Command message in Table 2 below. In these second embodiments, the serving radio access network node 110 such as the serving BSS is required examine the content of the RRLP Flag IE within the BSSLAP APDU IE included within the BSS-MAP-LE CONNECTION ORIENTED INFORMATION message to determine that a Multilateration Request is to be sent from the serving positioning node 130 such as the serving SMLC to the MS 120 via the core network node 140. Note that in these embodiments to also pass the Short Identity from the serving SMLC to the serving radio access network node 110 such as the serving BSS an additional field may preferably be added to the RRLP Flag IE or to add a new IE to the BSSLAP MS Position Command message.

TABLE 2

MS Position Command message content

| Information element | Type/Reference | Presence | Format | Length |
|---|---|---|---|---|
| Message Type | Message Type IE/5.1 | Mandatory (M) | V | 1 |
| flag | RRLP flag IE/5.15 | M | TV | 2 |
| RRLP Info | RRLP IE/5.16 | M | TLV | 3-n |

Where T, TV, TLV and TLV-E formatted IEs compose a non-imperative part of the message.

Some embodiments herein provide to code an RRLP flag IE element as follows, wherein MPM Timer and MPM are additions according to embodiments herein:

| 8 | 7 | 6 | 5 | 4 | 3 | 2 | 1 | |
|---|---|---|---|---|---|---|---|---|
| | | | Element identifier | | | | | octet 1 |
| SPARE | | MPM Timer | | | MPM | | Flag1 | octet 2 |

RRLP Flag IE with proposed new IEs above:

The fields are coded as follows:

| Flag 1 (Octet 2, bit 1): |
|---|
| 0 Position Command (SMLC to BSC) or final response (BSC to SMLC). |
| 1 Not a Positioning Command or final response |

For definition and coding of the fields MPM and MPM timer see first embodiments above.

In some third example embodiments, new Information elements are added to the BSSLAP MS Position Command message (see 3GPP TS 48.071) carried within the BSSLAP APDU IE of the BSSMAP-LE CONNECTION ORIENTED INFORMATION message sent from the serving positioning node 130 such as the serving SMLC to the serving radio access network node 110 such as the serving BSS as shown in Table 3 below. In these embodiments the presence of any of these new IEs indicates to the serving radio access network node 110 such as the serving BSS that a Multilateration Request is to be sent from the serving positioning node 130 such as the serving SMLC to the MS 120 via the core network node 140. It should be noted that to anyone skilled in the art that the content of the (BSSLAP) MS Position Command message may be constructed in many ways, e.g., the MPM timer field may or may not be included and may, when present be optional. This is also the case for the Short Identity field. It may or may not be included.

TABLE 3

MS Position Command message content, below

| Information element | Type/Reference | Presence | Format | Length |
|---|---|---|---|---|
| Message Type | Message Type IE/5.1 | M | V | 1 |
| flag | RRLP flag IE/5.15 | M | TV | 2 |
| MPM Timer | MPM Timer IE/5.x | M | TV | 2 |
| Short Identity | Short Identity IE/5.xx | Optional (O) | TV | 2 |
| RRLP Info | RRLP IE/5.16 | M | TLV | 3-n |

Embodiments herein provide to code MPM Timer IE element as follows:

| 8 | 7 | 6 | 5 | 4 | 3 | 2 | 1 | |
|---|---|---|---|---|---|---|---|---|
| | | | Element identifier | | | | | octet 1 |
| | SPARE | | | | MPM timer | | | octet 2 |

For definition and coding of the MPM timer field see first embodiments.

Embodiments herein provide to code Short Identity IE element as follows:

| 8 | 7 | 6 | 5 | 4 | 3 | 2 | 1 | |
|---|---|---|---|---|---|---|---|---|
| | | | Element identifier | | | | | octet 1 |
| | | | Short Identity | | | | | octet 2 |

The identity such as the short Identity may be assigned to the MS 120 in the RRLP Multilateration Request message.

In some fourth example embodiments, to notify the radio access network node 110 such as the BSS that the message such as the RRLP message to be sent to the MS 120 via the core network node 140 comprises a Multilateration Request and to provide the radio access network node 110 such as the BSS with a timer value. These fourth embodiments introduce a new BSSLAP (3GPP TS48.071) message that e.g. may be called "Multilateration Request", i.e. instead of modifying the existing "MS Position Command message", as shown in Table 4 below and wherein the RRLP IE in this new message comprises the RRLP Multilateration Request message to be sent to the MS 120 via the core network node 140 such as the SGSN. When the serving radio access network node 110 such as the serving BSS receives this new message it will know that the RRLP message comprised therein comprises an RRLP Multilateration Request message and thus that a Multilateration for the device such as the MS 120 associated to the SCCP connection is involved in Multilateration. The MPM timer and Short Identity may be added as IEs along with the RRLP flag and RRLP IEs. When receiving this message, the serving radio access network node 110 such as the serving BSS will invoke the position command procedure by sending the BSSGP POSITION-COMMAND PDU to the core network node 140 such as the SGSN including the RRLP Flag extracted from the "Multilateration Request" message and the RRLP APDU extracted from the RRLP IE of the "Multilateration Request" message. It should be noted that to anyone skilled in the art that the content of the "Multilateration Request" message can be constructed in many ways, e.g., the MPM timer field may or may not be included and may, when present be optional. This is also the case for the Short Identity field. It may or may not be included.

TABLE 4

Multilateration Request message content, below:

| Information element | Type/Reference | Presence | Format | Length |
|---|---|---|---|---|
| Message Type | Message Type IE/5.1 | M | V | 1 |
| flag | RRLP flag IE/5.15 | M | TV | 2 |
| MPM Timer | MPM Timer IE/5.x | M | TV | 2 |
| Short Identity | Short Identity IE/5.xx | O | TV | 2 |
| RRLP Info | RRLP IE/5.16 | M | TLV | 3-n |

Embodiments herein provide to code MPM Timer IE element as follows:

| 8 | 7 | 6 | 5 | 4 | 3 | 2 | 1 | |
|---|---|---|---|---|---|---|---|---|
| | | | Element identifier | | | | | octet 1 |
| | SPARE | | | | MPM timer | | | octet 2 |

See first embodiments for proposed coding of the MPM Timer field.

Embodiments herein provide to code Short Identity IE element as follows:

| 8 | 7 | 6 | 5 | 4 | 3 | 2 | 1 | |
|---|---|---|---|---|---|---|---|---|
| | | | Element identifier | | | | | octet 1 |
| | | | Short Identity | | | | | octet 2 |

The short Identity is assigned to the MS in the RRLP Multilateration Request message.

Figure 4:
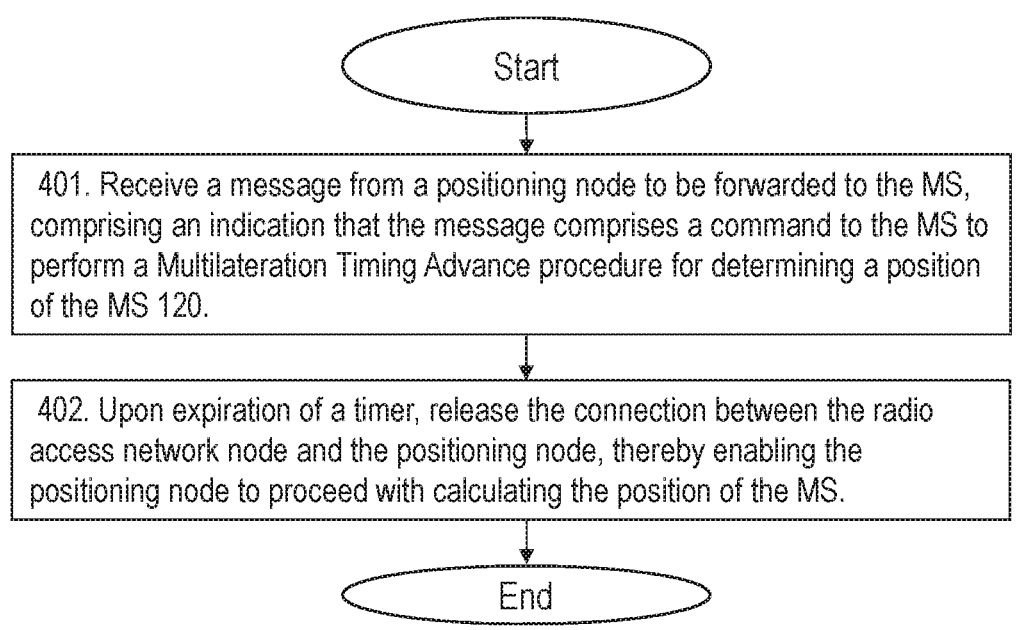
FIG. 4 is a flowchart depicting embodiments of a method from a radio access network node perspective.

Example embodiments are disclosed in the following paragraphs:

FIG. 4 is a flowchart depicting embodiments of a method performed in the radio access network node 110.

Embodiment 1

A method performed by a Radio access network node 110 such as e.g. a BSS. The radio access network node 110 e.g. serves a Mobile Station, MS, 120. The method comprises:

Receiving 401 a message such as e.g. a RRLP message from a positioning node 130, such as e.g. an SMLC, e.g. to be forwarded to the MS 120 e.g. via the core network node 140, The message comprises an indication that said message comprises a command to the MS 120 to perform a Multilateration Timing Advance procedure for determining a position of the MS 120.

All of the signalling between the radio access network node 110 such as e.g. the BSS and the positioning node 130, such as e.g. the SMLC may be a so called connection oriented which means that each signalling connection is associated with a specific device such as e.g. the MS 120 for which the positioning procedure has been triggered by the positioning node. The signalling connection is established at the beginning of the procedure and preferably needs to be kept until the positioning procedure is ended. In order for the BSS to know for how long to keep the connection it needs to know that it has started a positioning procedure for which there may not be any final RRLP message from the MS 120 that the radio access network node 110 may use as indication that the procedure has ended.

Embodiment 2

The method according to Embodiment 1, wherein the message is received in a Connection Oriented message such as e.g. the BSS-MAP CONNECTION ORIENTED INFORMATION Message sent over a connection, such as e.g. an SCCP connection between the radio access network node 110 such as the serving BSS and the positioning node 130, such as e.g. the serving SMLC.

Embodiment 3

The method according to any of the Embodiments 1-2, wherein the message further comprises a timer, which timer determines how long time a Multilateration Timing Advance procedure is to run in the radio access network node 110.

Embodiment 4

The method according to Embodiment 3, further comprising:

Upon expiration of the timer, releasing 402 the connection such as e.g. the SCCP connection between the radio access network node 110 such as the serving BSS and the positioning node 130, such as e.g. the serving SMLC, thereby enabling the positioning node 130, such as e.g. the serving SMLC to proceed with calculating the position of the MS. E.g. since no additional cell specific timing advance information will be forthcoming from the serving BSS for that specific positioning procedure.

Embodiment 5

The method according to any of the Embodiments 1-4, wherein the message further comprises an identity assigned by the positioning node 130, such as e.g. the serving SMLC, associated with the connection such as e.g. the SCCP connection e.g. a "Short Identity" field (e.g. 8 bits long).

Embodiment 6

A computer program comprising instructions, which when executed by a processor in the radio access network node 110, cause processor to perform actions according to any of the Embodiment 1-5.

Embodiment 7

A carrier comprising the computer program of Embodiment 6, wherein the carrier is one of an electronic signal, an optical signal, an electromagnetic signal, a magnetic signal, an electric signal, a radio signal, a microwave signal, or a computer-readable storage medium.

Figure 6:
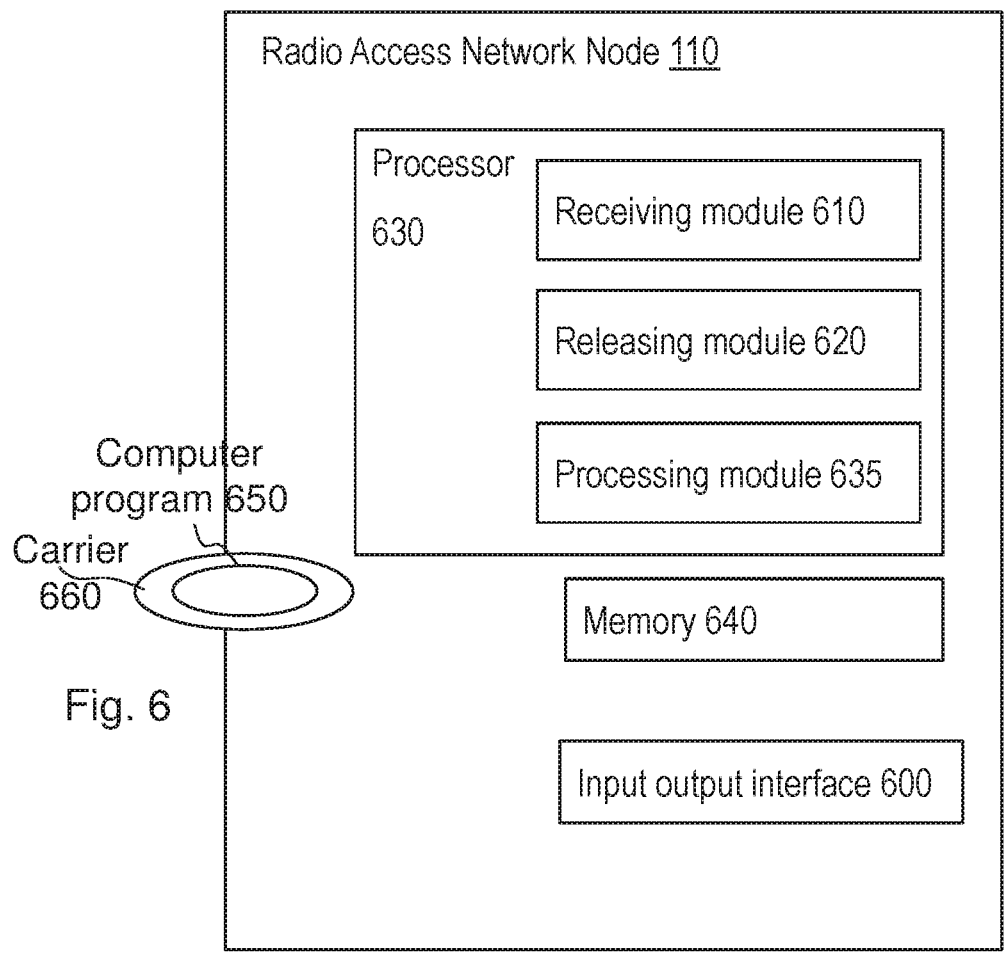
FIG. 6 is a schematic block diagram illustrating some first embodiments of the radio access network node.

FIG. 6 is a flowchart depicting embodiments of a method performed in the positioning node 130.

Embodiment 8

A method performed by a positioning node 130, such as e.g. an SMLC, the method comprising:

Sending 501 a message such as e.g. a RRLP message to a radio access network node 110 such as e.g. a BSS, to be forwarded to a Mobile Station, MS, 120. The radio access network node 110 e.g. serves a Mobile Station, MS, 120 e.g. via the core network node 140.

The message comprises an indication that said message comprises a command to the MS 120 to perform a Multilateration Timing Advance procedure for determining a position of the MS 120.

Embodiment 9

The method according to Embodiment 8, wherein the message is sent in a Connection Oriented message such as e.g. the BSS-MAP CONNECTION ORIENTED INFORMATION Message sent over a connection, such as e.g. an SCCP connection between the radio access network node 110 such as the serving BSS and the positioning node 130, such as e.g. the serving SMLC.

Embodiment 10

The method according to any of the Embodiments 8-9, wherein the message further comprises a timer, which timer determines how long time a Multilateration Timing Advance procedure is to run in the radio access network node 110.

Embodiment 11

The method according to Embodiment 10, further comprising:

upon expiration of the timer, being released 502 from the connection such as e.g. the SCCP connection between the radio access network node 110 such as the serving BSS and the positioning node 130, such as e.g. the serving SMLC, by the radio access network node 110 such as the serving BSS. Thereby enabling the positioning node 130, such as e.g. the serving SMLC to proceed with calculating the position of the MS e.g. since no additional cell specific timing advance information will be forthcoming from the serving BSS for that specific positioning procedure.

Embodiment 12

The method according to any of the Embodiments 8-11, wherein the message further comprises an identity assigned by the positioning node 130, such as e.g. the serving SMLC, associated with the connection such as e.g. the SCCP connection e.g. a "Short Identity" field (e.g. 8 bits long).

Embodiment 13

A computer program comprising instructions, which when executed by the processor, cause processor to perform actions according to any of the Embodiments 8-12.

Embodiment 14

A carrier comprising the computer program of Embodiment 13, wherein the carrier is one of an electronic signal, an optical signal, an electromagnetic signal, a magnetic signal, an electric signal, a radio signal, a microwave signal, or a computer-readable storage medium.

To perform the method actions the radio access network node 110 such as e.g. a BSS, wireless communications network 100 may comprise the following arrangement depicted in FIG. 6. FIG. 6 is a schematic block diagram illustrating some first embodiments of the radio access network node 110.

The radio access network node 110 comprises an input and output interface 600 configured to communicate e.g. with the MS 120. The input and output interface 600 may comprise a receiver (not shown) and a transmitter (not shown).

Embodiment 15

The radio access network node 110 is configured to serve the Mobile Station, MS, 120. The radio access network node 110 such as e.g. the BSS, is configured to:

Receive a message such as e.g. a RRLP message from a positioning node 130, such as e.g. an SMLC, e.g. to be forwarded to the MS 120 e.g. via the core network node 140, e.g. by means of a receiving module 610. The message comprises an indication that said message comprises a command to the MS 120 to perform a Multilateration Timing Advance procedure for determining a position of the MS 120.

Embodiment 16

The radio access network node 110 as e.g. the BSS, according to Embodiment 15, wherein the message is adapted to be received in a Connection Oriented message such as e.g. the BSS-MAP CONNECTION ORIENTED INFORMATION Message sent over a connection, such as e.g. an SCCP connection between the radio access network node 110 as the serving BSS and the positioning node 130, such as e.g. the serving SMLC.

Embodiment 17

The radio access network node 110 as e.g. the BSS, according to any of the Embodiments 15-16, wherein the message further is adapted to comprise a timer, which timer determines how long time a Multilateration Timing Advance procedure is to run in the radio access network node 110.

Embodiment 18

The radio access network node 110 as e.g. the BSS, according to Embodiment 17, further being configured to:

Upon expiration of the timer, release e.g. by means of a releasing module 620, the connection such as e.g. the SCCP connection between the radio access network node 110 such as the serving BSS and the positioning node 130, such as e.g. the serving SMLC. Thereby enabling the positioning node 130, such as e.g. the serving SMLC to proceed with calculating the position of the MS e.g. by means of a releasing module. E.g. since expiration of the timer indicates no additional cell specific timing advance information will be forthcoming from the serving BSS for that specific positioning procedure.

Embodiment 19

The radio access network node 110 as e.g. the BSS, according to any of the Embodiments 15-18, wherein the message further is adapted to comprise an identity assigned by the positioning node 130, such as e.g. the serving SMLC, associated with the connection such as e.g. the SCCP connection is received. thereby allowing it to uniquely associate the connection with the commanded Multilateration Timing Advance procedure.

The embodiments herein may be implemented through one or more processors, such as a processor 630 of a processing circuitry in the radio network node 110 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the radio access network node 110. One such carrier may be in the form of a CD ROM disc. It is however feasible with other data carriers such as a memory stick. The computer program code may furthermore be provided as pure program code on a server and downloaded to the radio access network node 110.

The radio access network node 110 may further comprise a memory 640 comprising one or more memory units. The memory 640 comprises instructions executable by the processor 630.

The memory 640 is arranged to be used to store e.g. configuration information, user data and applications to perform the methods herein when being executed in the radio access network node 110.

In some embodiments, a computer program 650 comprises instructions, which when executed by the at least one processor 750, causes the at least one processor 750 to perform the method according to any of the Actions 401-402.

In some embodiments, a carrier 660 comprises the computer program 650, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the radio access network node 110, described above may refer to a combination of analog and digital circuits, and/or one or more processors configured with software and/or firmware, e.g. stored in the memory 640, that when executed by the one or more processors such as the processor 630 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 7:
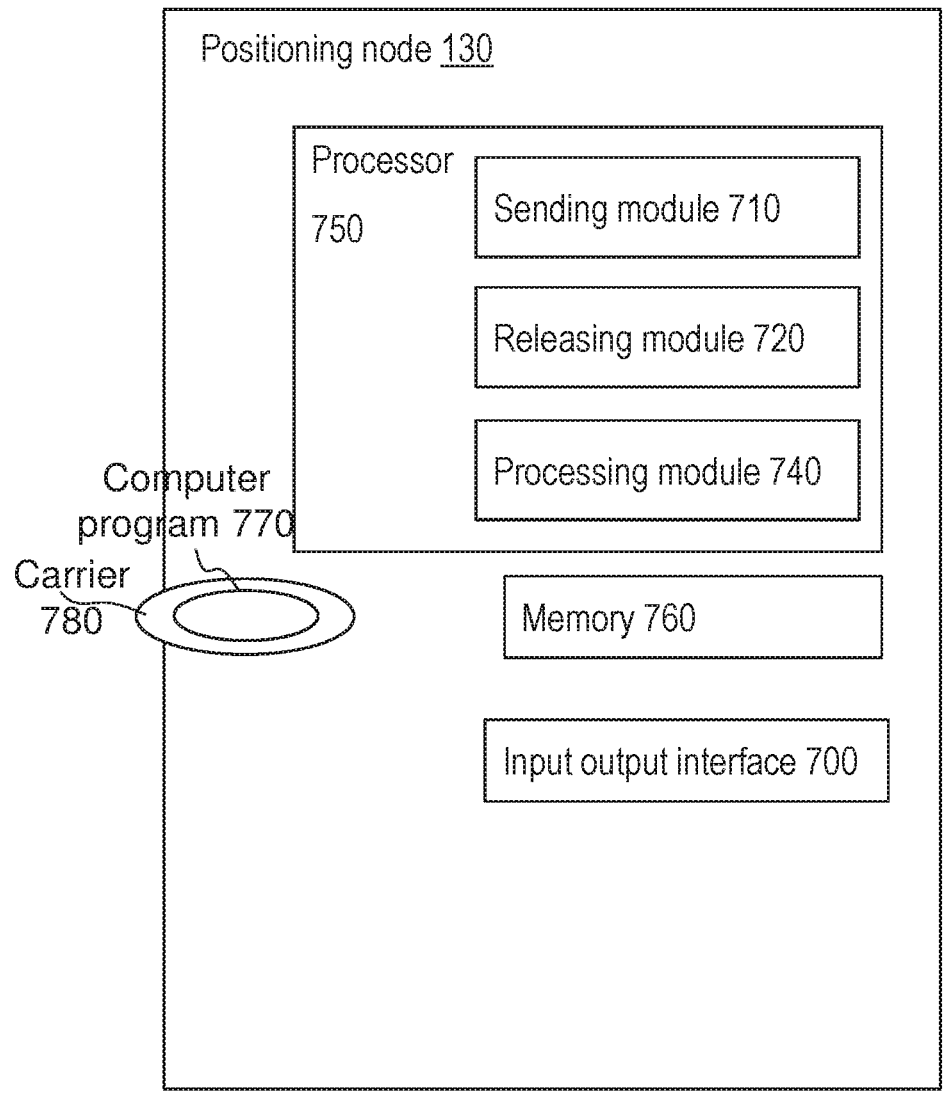
FIG. 7 is a schematic block diagram illustrating some first embodiments of the positioning node.

To perform the method actions the positioning node 130, such as e.g. an SMLC, may comprise the following arrangement depicted in FIG. 7. FIG. 7 is a schematic block diagram illustrating some first embodiments of the positioning node 130.

The positioning node 130 may comprise an input and output interface 700 configured to communicate with one or more radio access network nodes such as the radio access network node 110. The input and output interface 700 may comprise a receiver (not shown) and a transmitter (not shown).

Embodiment 20

The positioning node 130 is configured to:

Send e.g. by means of a sending module 710, a message such as e.g. a RRLP message to a radio access network node 110 as e.g. a BSS, to be forwarded to a Mobile Station, MS, 120, e.g. via the core network node 140 wherein the radio access network node 110 e.g. serves a Mobile Station, MS, 120.

The message comprises an indication that said message comprises a command to the MS 120 to perform a Multilateration Timing Advance procedure for determining a position of the MS 120.

Embodiment 21

The positioning node 130, such as e.g. the SMLC, according to Embodiment 20, wherein the message is adapted to be sent in a Connection Oriented message such as e.g. the BSS-MAP CONNECTION ORIENTED INFORMATION Message sent over a connection, such as e.g. an SCCP connection between the radio access network node 110 as the serving BSS and the positioning node 130, such as e.g. the serving SMLC.

Embodiment 22

The positioning node 130, such as e.g. the SMLC, according to any of the Embodiments 20-21, wherein the message further is adapted to comprise a timer, which timer determines how long time a Multilateration Timing Advance procedure is to run in the radio access network node 110.

Embodiment 23

The positioning node 130, such as e.g. the SMLC, according to Embodiment 22, may further be configured to:

Upon expiration of the timer, be released e.g. by means of a releasing module 720, from the connection such as e.g. the SCCP connection between the radio access network node 110 as the serving BSS and the positioning node 130, such as e.g. the serving SMLC, by the radio access network node 110 as the serving BSS. Thereby enabling the positioning node 130, such as e.g. the serving SMLC to proceed with calculating the position of the MS E.g. since release of the connection indicates no additional cell specific timing advance information will be forthcoming from the serving BSS for that specific positioning procedure.

Embodiment 24

The positioning node 130, such as e.g. the SMLC, according to any of the Embodiments 20-23, wherein the message further is adapted to comprise an identity assigned by the positioning node 130, such as e.g. the serving SMLC, associated with the connection such as e.g. the SCCP connection is sent to the radio access network node 110 thereby allowing it to uniquely associate the connection with the commanded Multilateration Timing Advance procedure.

The embodiments herein, may be implemented through one or more processors, such as a processor 750 of a processing circuitry in the positioning node 130 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into positioning node 130. One such carrier may be in the form of a CD ROM disc. It is however feasible with other data carriers such as a memory stick. The computer program code may furthermore be provided as pure program code on a server and downloaded to the positioning node 130.

The positioning node 130 may further comprise a memory 760 comprising one or more memory units. The memory 760 comprises instructions executable by the processor 750.

The memory 760 is arranged to be used to store e.g. configuration information, user data and applications to perform the methods herein when being executed in the positioning node 130.

In some embodiments, a computer program 770 comprises instructions, which when executed by the at least one processor 750, causes the at least one processor 750 to perform the method according to any of the Actions 501-502.

In some embodiments, a carrier 780 comprises the computer program 770, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the positioning node 130 described above may refer to a combination of analog and digital circuits, and/or one or more processors configured with software and/or firmware, e.g. stored in the memory 760, that when executed by the one or more processors such as the processor 750 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

ABBREVIATIONS

BTS Base Transceiver Station
EC-GSM-IoT Extended Coverage GSM-IoT
GSM Global System for Mobile telephony
IoT Internet of Things
LTE Long Term Evolution
MS Mobile Station
MTC Machine Type Communication
NB-IoT Narrow Band IoT
TA Timing Advance As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module 635, 740 may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "Number", "value" may also be represented by a bit string.

As used herein, the expression "in some embodiments" has been used to indicate that the features of the embodiment described may be combined with any other embodiment disclosed herein.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a radio access network node, which radio access network node serves a Mobile Station, MS, the method comprising:
   receiving a message from a positioning node, to be forwarded to the MS,
   which message comprises an indication that said message comprises a command to the MS to perform a Multilateration Timing Advance procedure for determining a position of the MS, wherein the message is received in a Connection Oriented message received over a connection between the radio access network node and the positioning node, and wherein the Connection Oriented message further comprises a timing indication, which timing indication indicates an amount of time the Multilateration Timing Advance procedure is to run in the radio access network node; and controlling that the connection is not released until the positioning procedure is completed which is when the timing indication expires by expiration of the amount of time, releasing the connection between the radio access network node and the positioning node, thereby indicating no additional Multilateration Timing Advance procedure related information will be forthcoming from the radio access node for that connection.

2. The method according to claim 1, wherein the Connection Oriented message comprises an identity assigned by the positioning node and uniquely identifies the connection.

3. A computer program product comprising a non-transitory computer readable medium storing instructions, which when executed by a processor, cause processor to perform the method according to claim 1.

4. A method performed by a positioning node, the method comprising:

sending a message to a radio access network node to be forwarded to a Mobile Station, MS, wherein the radio access network node serves the Mobile Station, MS, which message comprises an indication that said message comprises a command to the MS to perform a Multilateration Timing Advance procedure for determining a position of the MS, wherein the message is sent in a Connection Oriented message using a connection between the radio access network node and the positioning node, and wherein the Connection Oriented message further comprises a timing indication, which timing indication indicates an amount of time a Multilateration Timing Advance procedure is to run in the radio access network node; and upon expiration of the the amount of time, being released from the connection between the radio access network node and the positioning node by the radio access network node, wherein the connection is not released until the positioning procedure is completed which is when the amount of time expires, thereby indicating no additional Multilateration Timing Advance procedure related information will be forthcoming from the radio access node for that connection.

5. The method according to claim 4, wherein the Connection Oriented message comprises an identity assigned by the positioning node and uniquely identifies the connection.

6. A computer program product comprising a non-transitory computer readable medium storing instructions, which when executed by a processor, cause processor to perform actions according to claim 4.

7. A radio access network node which radio access network node is configured to serve a Mobile Station, MS, the radio access network node being configured to:

receive a message from a positioning node to be forwarded to the MS, which message is adapted to comprise an indication that said message comprises a command to the MS to perform a Multilateration Timing Advance procedure for determining a position of the MS, wherein the message is adapted to be received in a Connection Oriented message received over a connection between the radio access network node and the positioning node, and wherein the Connection Oriented message further is adapted to comprise a timing indication, which timing indication indications an amount of time a Multilateration Timing Advance procedure is to run in the radio access network node, and wherein the radio access network node; and control that the connection is not released until the positioning procedure is completed which is when the amount of time expires, and upon expiration of the amount of time, release the connection between the radio access network node and the positioning node, thereby indicating no additional Multilateration Timing Advance procedure related information will be forthcoming from the radio access node for that connection.

8. The radio access network node according to claim 7, wherein the Connection Oriented message comprises an identity assigned by the positioning node and uniquely identifies the connection.

9. A positioning node being configured to:

send a message to a radio access network node to be forwarded to a Mobile Station, MS, wherein the radio access network node is adapted to serve a Mobile Station, MS, which message comprises an indication that said message comprises a command to the MS to perform a Multilateration Timing Advance procedure for determining a position of the MS, wherein the message is adapted to be sent in a Connection Oriented message using a connection, between the radio access network node and the positioning node, and wherein the Connection Oriented message further is adapted to comprise a timing indication, which timing indication indicates an amount of time a Multilateration Timing Advance procedure is to run in the radio access network node, further being configured to:

upon expiration of the amount of time, be released from the connection between the radio access network node and the positioning node, by the radio access network node, wherein the connection is not released until the positioning procedure is completed which is when the amount of time expires, thereby indicating no additional Multilateration Timing Advance procedure related information will be forthcoming from the radio access node for that connection.

10. The positioning node according to any of the claim 9, wherein the Connection Oriented message comprises an identity assigned by the positioning node and uniquely identifies the connection.

* * * * *